Nov. 19, 1929.　　　J. S. THURMAN　　　1,736,233
COTTON HARVESTER
Filed Sept. 13, 1923　　6 Sheets-Sheet 2
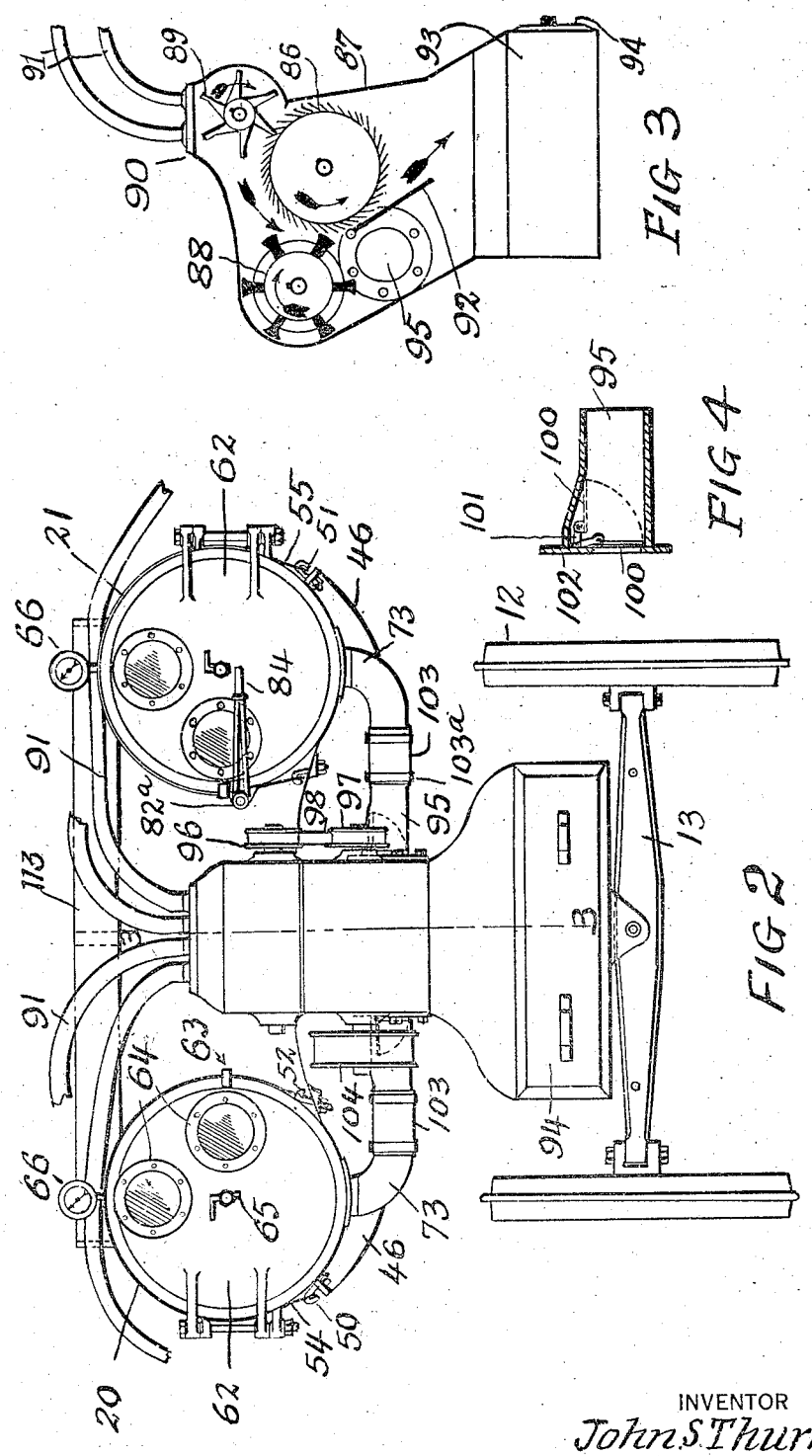
INVENTOR
John S. Thurman
BY
Arthur C. Eckert
ATTORNEY Nov. 19, 1929.   J. S. THURMAN   1,736,233
COTTON HARVESTER
Filed Sept. 13, 1923   6 Sheets-Sheet 4

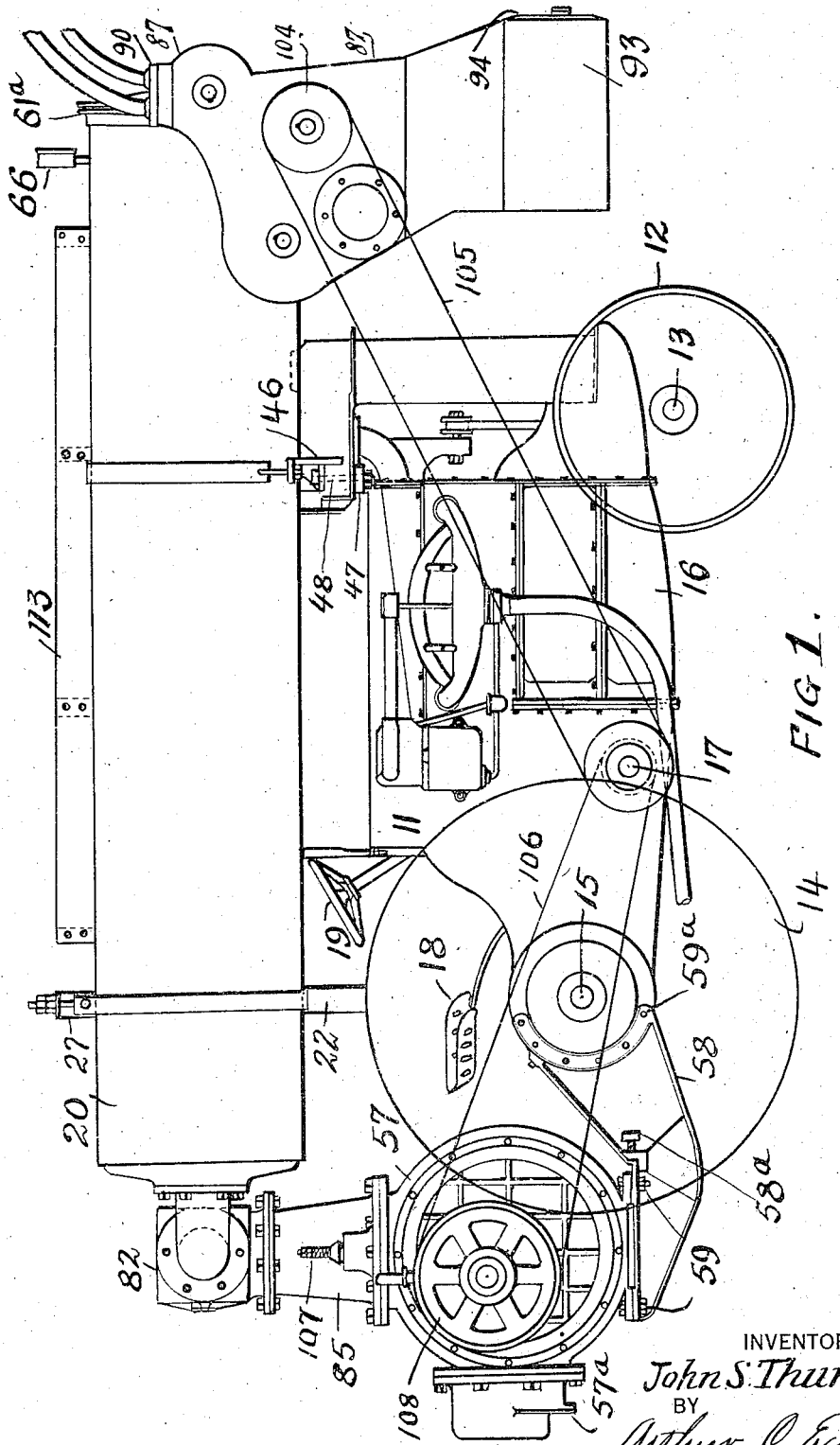

INVENTOR
John S. Thurman
BY
Arthur C. Eckert
ATTORNEY

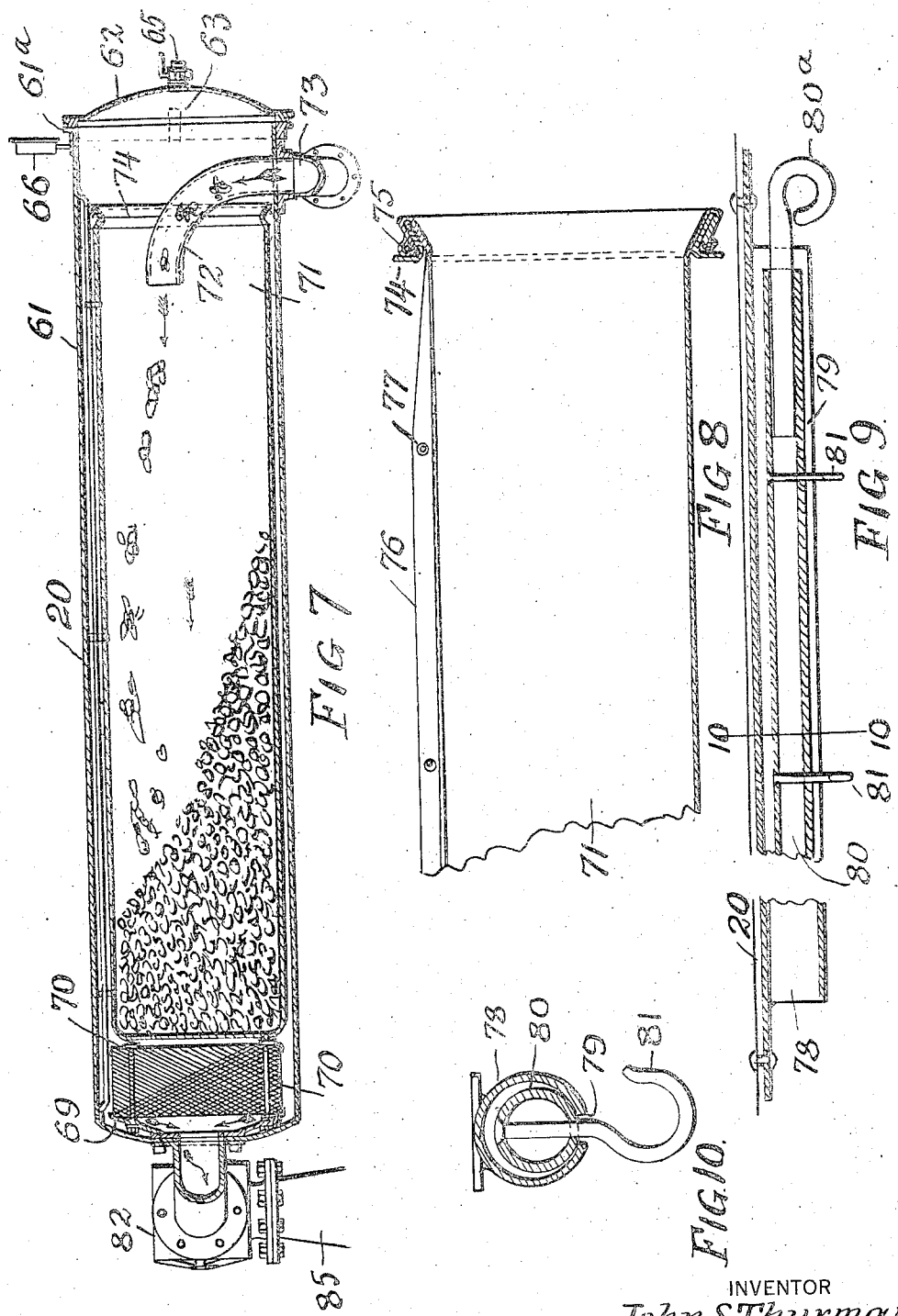

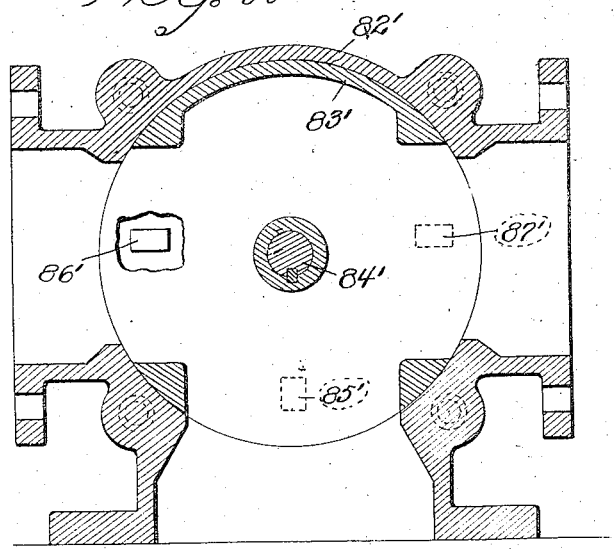
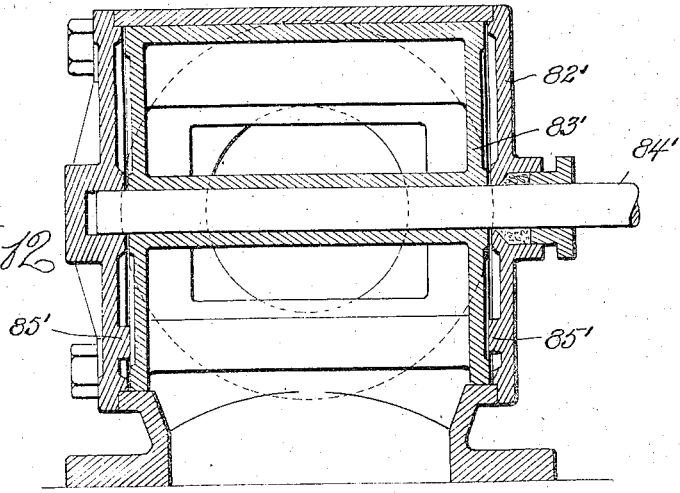

UNITED STATES PATENT OFFICE

JOHN S. THURMAN, OF ST. LOUIS, MISSOURI

COTTON HARVESTER

Application filed September 13, 1923. Serial No. 662,528.

This invention relates generally to combination harvesting and ginning machines. By the use of my machine the cotton is picked by a mere presentation of nozzles to bolls and ginned in its progress through the machine, the lint being delivered to a bag or bags and the seed to a proper container. The entire machine is detachably secured to a tractor or other vehicle or engine, so that it may be secured or detached by the application or removal of a few bolts, whereby the entire device may be readily moved over the entire field to be harvested and ginned and whereby when the picking and ginning is completed, the vehicle may be free for other work.

This invention relates more specifically to a vacuum cotton harvester, the vacuum being produced by a rotary pump. It requires a vacuum of seven inches mercury column to pull the lint from the bolls. Applicant is aware that unsuccessful attempts have been made to pick or harvest cotton by means of suction fans to create a suction using large hose in order to overcome the friction, but he is not aware that a fan has as yet been invented which has produced an inch of vacuum mercury column. The fan or blower merely puts the air in motion, whereas a rotary pump instantly displaces practically all the air, thereby causing a violent and powerful inrush of air to fill the partial void in the vacuum tanks. As far as applicant is advised, all fan devices resort to mechanical means to tear the cotton from the bolls and the air displacement of the fan is used merely to convey the cotton away. When the openings are closed on a suction fan or blower, the fan or blower will revolve with greater ease, while with a positive acting suction pump with the openings closed, it will put a greater strain on the motor and will overload the motor to a breaking point, unless safety means are provided to admit atmospheric air to relieve the vacuum. This demonstrates the greater force of the suction pump in its operation and its efficiency when practically used as compared to a fan.

Among the plurality of objects of my device are included the fabrication of a machine having a plurality of hose and nozzles for picking, a plurality of vacuum tanks, removable, collapsible cotton containers being detachably secured in the tanks in sliding engagement. Further objects are to supply the vacuum tank intakes with a valve so that the process of picking and ginning may be continuously carried on without interruption either when a sack of cotton is being removed from the apparatus, or when the cotton is being delivered to either of the tanks separately or to all together. A still further object is to interpose a gin between the picking nozzles and the sack containers in the tanks, with a suitable, removable seed container positioned in the gin.

My device offers means for controlling the passage of air to and from the tanks and to provide each of the tanks with a dust screen by which air is thoroughly screened of all dust and trash entering the vacuum pump. An excess vacuum pressure valve that will automatically admit air into the tanks should the vacuum pressure become excessive during the continuous pump operation in the absence of picking is provided as well as automatic flap valves to shut off the vacuum from the tank to be emptied. The bags are provided with a seam in which are formed eyes which may be positioned on hooks formed on a pipe which in turn is positioned in sliding engagement in a second pipe positioned at the inner top of the container. By this means the bags may be easily inserted and removed. Furthermore, the bags are made sufficiently porous to permit any fine dirt that may be associated with the cotton to sift through to the vacuum tanks from which it may be easily removed. Simple methods for securing the open ends of the bags in the vacuum tanks are provided so that the bags may be quickly attached. Means for deflecting the cotton lengthwise in the sack are also included. The tanks are supported on the vehicle by means of a saddle and columns so as not to occupy the space necessarily needed by the driver of the vehicle and to hold the tanks in a definite spaced relationship and permit the lifting by pulleys or other means of the entire device from and above the vehicle so that the vehicle may be driven out from under the device with its own power.

A further object is to employ a powerful rotary vacuum pump that will maintain a high pressure, the pump being so positioned that it may be easily belted to the drive shaft of the tractor or vehicle. A still further advantage is the positioning of the gin so that the vacuum created in the tanks will pervade the gin and hose and nozzles. Furthermore, the gin is so positioned that it may be easily and directly geared and belted to the drive shaft of the tractor. It will be seen that the tractor furnishes the power for the vacuum pump and the gin.

With these and other objects in view, my invention has relation to certain novel features of construction and arrangement of parts as will be hereinafter more fully described pointed out in the claims and illustrated in the drawings in which Fig. 1 is a side elevation of my device with one tank removed showing the general arrangement of the elements.

Fig. 2 is a front elevation of my device.

Fig. 3 is a sectional elevation on the line 3—3 of Fig. 2.

Fig. 4 is a sectional elevation of one of the flap valves and its connection to the gin.

Figure 6:
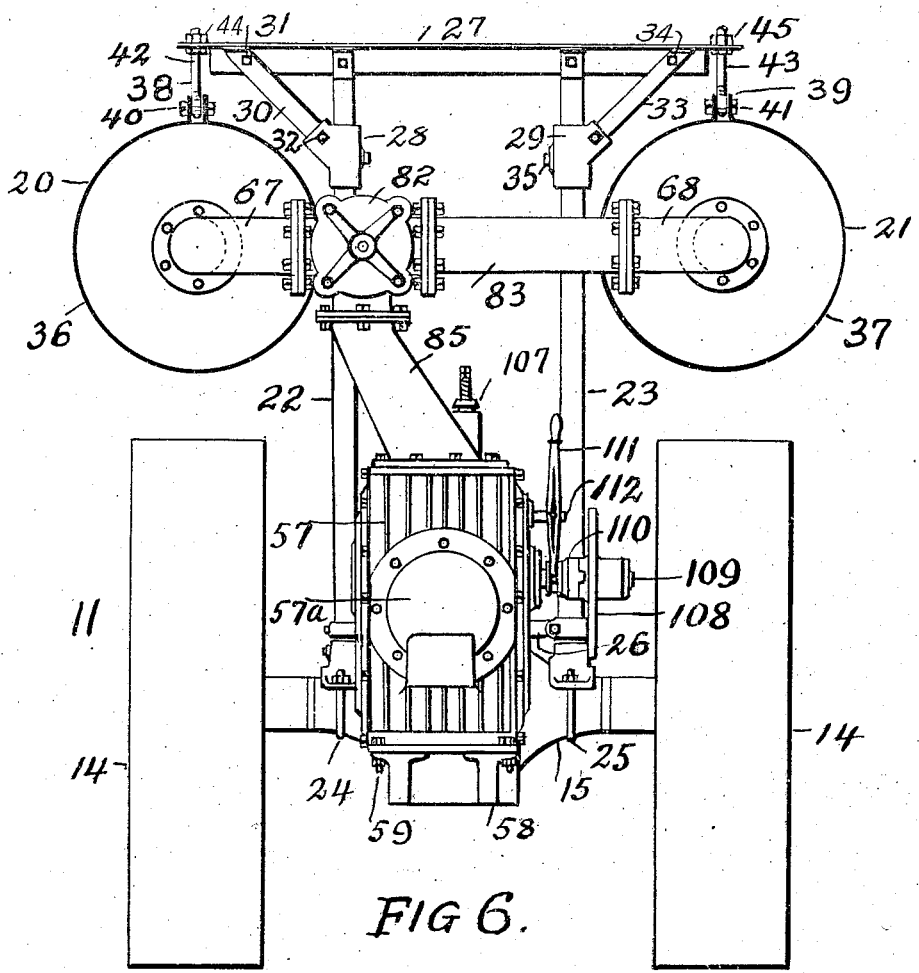
Fig. 6 is a rear elevation of my device.

Fig. 6ª is a picture of a human figure with a waist belt provided with a T hose connection and two nozzles showing the method employed in picking with both hands.

Fig. 7 is a longitudinal sectional elevation of one of my tanks and bags, together with its connection with the suction conduit.

Fig. 8 is an enlarged, fragmental, longitudinal, sectional elevation of one of my sacks, together with its retaining ring.

Fig. 9 is a fragmental, longitudinal, sectional elevation of a sack rod and guide.

Fig. 10 is a transverse, sectional elevation on the line 10—10 of Fig. 9.

Fig. 11 is a longitudinal sectional elevation of a three way valve used in my device.

Fig. 12 is a vertical median section of Fig. 11.

Figure 5:
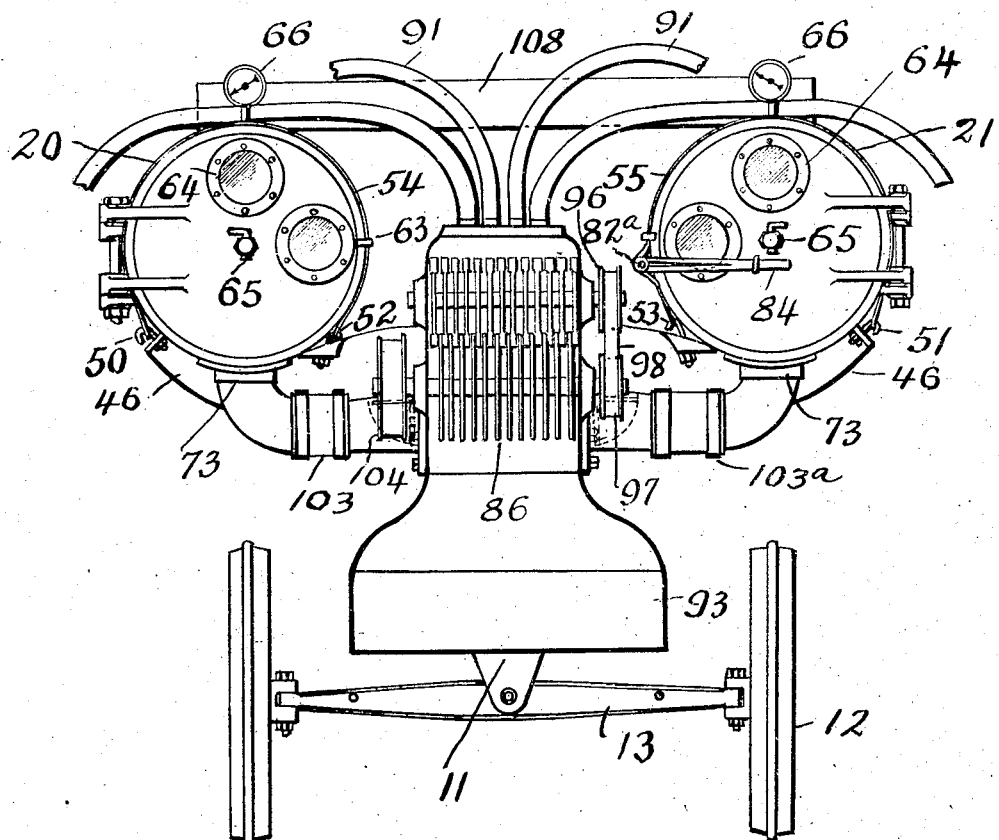
Fig. 5 is a front elevation of my device with the front gin cover removed showing the gin saws and brushes.

In the embodiment of the invention illustrated in the drawings the device is shown as including the conventional tractor 11 having the front wheels 12 secured to the front axle 13 and the rear wheels 14 secured to the rear axle 15 in the usual manner. Numeral 16 designates the motor having the drive pulley 17, the driver's seat 18 and the steering post and wheel 19. On this vehicle my structure is positioned. In order to support my vacuum tanks 20 and 21, the two columns 22 and 23 are provided, which are firmly secured in an upright position on the rear axle 15 on the differential housing mounted thereon by means of the bolt straps and nuts 24 and 25. The tie rod 26 is secured at one end to the column 22 and at the other end to the column 23. The upper ends of the columns 22 and 23 are bolted to the cross beam 27 as best shown in Fig. 6. Numeral 28 designates a Y fitting positioned on the column 22 in sliding engagement therewith and having a set screw formed therein for selective positioning on the column. Numeral 29 designates a similar Y fitting positioned on the column 23 in sliding engagement and also having a set screw formed therein for selective positioning on the column 23. Numeral 30 designates an arm rotatively secured to the cross beam 27 at one end by means of the bolt 31 and set in the Y fitting 28 at its other end. Numeral 32 designates a set screw positioned in the arm cup 28 for fastening the arm 30 to the Y fitting 28. Numeral 33 designates an arm rotatively secured to the cross beam 27 at one end by means of the bolt 34 and set in the Y fitting 29 at its other end. Numeral 35 designates a set screw position in the Y fitting 29 for fastening the arm 33 to the Y-fitting 29. Straps 36 and 37 encircle the tanks 20 and 21, having their closing ends terminate in projections 38 and 39 in which are formed eyes through which the bolts 40 and 41 pass. Straps 42 and 43 are passed around the bolts 40 and 41 and through holes in the ends of the cross beam 27. By means of nuts 44 and 45, the straps 42 and 43 and hence the straps 36 and 37, and hence the vacuum tanks 20 and 21 are secured to the cross beam 27, and hence to the columns 22 and 23, and hence to the rear axle of the tractor. By means thus far described, the rear ends of the tanks are secured to the tractor. For securing the front ends of the tanks to the tractor, a saddle 46 is employed which rides on the engine frame as best shown in Figs. 1, 2 and 5. The saddle is secured to the engine by means of the plate 47 and the bolts 48. At the external ends of the saddle 46 are bolted the hooks 50 and 51. Intermediate the ends and the center of the saddle, the hooks 52 and 53 are bolted. By means of circular bands 54 and 55 having holes drilled therein at their ends, the tanks 20 and 21 are secured near their front ends to the saddle 46. The tanks lie in arcuated grooves in the saddle. The bolts of the hooks 50 and 51 may be manipulated to tighten or loosen the bands 54 and 55. The remainder of my device including the gin and pump is supported from the tanks. The positive acting rotary pump 57 having an exhaust 57ª is additionally supported from the tractor by means of the two brackets 58 which are secured to the pump base by means of the bolts 59 and to the tractor by means of the bolts 59ª. The pump is slidably secured so that the belt (to be subsequently described) may be tightened by means of the set screws 58ª. It will be seen, therefore, that my device is suspended or supported on the tractor at three points and that by the application or removal of a few bolts at each securing point, it may be readily placed in position or removed. The planter may suspend my device from pulleys from any convenient place in the barn when my device is not in use. When he desires to use my device, he drives the tractor by its own power under my device, lowers it by means of the pulleys into position on to the tractor, fastens the bolts at the points of suspension and he is ready to proceed into the field to pick and gin cotton. My vacuum tanks of which there may be one, two or more, consist of the shell such as 61 open at the front end and having the flanges 61ª and the door such as 62 hingedly secured to the flange with the flat spring door catch 63 attached and to hold the door closed. A rubber gasket is inserted in the flanges to seal the door. In the doors are formed glazed openings 64 in order to make the interior of the tanks visible. The hand lever valve 65 is also positioned on each of the doors. If a piece of lint is caught in between the flap valve 100 (to be subsequently described) and its seat, a partial vacuum in the tank would be maintained when the tank is intended to be closed, thus preventing the free opening of the door. By turning the lever handle 65 thereby admitting atmospheric air, the vacuum will be overcome and the door may be freely opened. A vacuum pressure gage such as 66 is placed on the shell 61 in a convenient position.

By this means the operator may always know the exact vacuum that is being maintained in the tanks. In the opposite ends of the tanks 20 and 21 are connected the pipes such as 67 and 68 establishing a fluid communication with the vacuum pump 57 by additional means to be described later. A metallic dirt screen box 69 held together by the bolts 70 is secured in the rear ends of the tanks 20 and 21. A porous cloth is tied over the screen box 69 in order to further screen the dirt and to prevent it passing from the tanks to the pump 57. The cotton upon entering the tanks after having passed through the gin (to be described later) is deposited in cloth sacks 71 of the length and smaller diameter than the tanks for the air to circulate between as best shown in Figs. 7 and 8.

The entry of the cotton to the tanks 20 and 21 is made through the removable curved spout 72 which is inserted into the pipe such as 73 through the shell such as 61. The spout 72 has its free end in a horizontal plane so that the cotton is shot longitudinally into the sacks. The cloth sack such as 71 is open at one end. In order to maintain the receiving end of the sack in an open and not in a collapsible position, a ring 74 made of metal is employed. The ends of the sacks are stretched over the ring, leaving the sack end open. The sacks are then tied to the ring by means of the cord 75. In order to hold the sacks in the tanks in an open position and to enable them to be easily inserted and removed in and from the tanks, the following instrumentalities are employed: A longitudinal seam such as 76 is formed on each sack having eyes 77 formed therein at regular intervals. A pipe 78 having a longitudinal slot formed therein is positioned at the top of the inside of the vacuum tanks and secured to them at the front and rear ends thereof. A pipe 80 having a handle 80ª and hooks 81 secured thereto at various points, as best shown in Fig. 10 is placed in sliding engagement in the pipe 78 so that the hooks 81 will slide through the slots 79. The hooks 81 are spaced apart the same distance as are the eyes 77. The bags may, therefore, be suspended in the tanks by hanging them on the hooks 81 by means of their eyes 77. To insert or remove a bag in or out of its tank the curved spout 72 is removed and the pipe 80 is simply slid in or out in the pipe 78. The pipes 67 and 68 connect with the three way valve 82 in the rear of the tanks 20 and 21 by means of the pipes and joints 83. The valve 82 is positioned on one side of the center rather than in the center in order to make it possible for the driver to have sufficient space to be seated on the seat 18 and control the steering post and wheel 19. A rod 82ª connects the valve 82 with the lever 84 in the front of one of the tanks such as 21. The purpose of the valve 82 is to make the operation of picking and ginning continuous at all times including the time when one of the sacks 76 is being removed from its tank. In other words, when the cotton sack that is filled is being removed from one tank the cotton is continuing to be led into the other tank. When both tanks are open, it is possible by the downward position of the valve lever 84 to have the cotton delivered into all containers simultaneously. The valve 82 is placed in fluid communication with the pump 57 by means of the pipe 85. The valve 82 is a three way valve so designed that the pipe 85 is in fluid communication with either one or both of the pipes 67, 68 at all times. This valve is shown enlarged in Figs. 11 and 12. Numeral 82' designates the valve case and 83' the valve, which is keyed to the shaft 84'. Numeral 85' designates a projection or stop on the head of the casing, and numerals 86' and 87' projections on the valve. When the valve is rotated, the limits of rotation or oscillation are made by these stops. When the valve is in the position shown in Fig. 11, the pipe 85 is in fluid communication with both pipes 67 and 68. When the valve is rotated in a clockwise direction until the stop 87' comes in contact with the stop 85', communication with the pipe 68 will be destroyed. When the valve is turned in an anti-clockwise direction until the stop 86' comes in contact with the stop 85', communication with the pipe 85 will be destroyed. The pump 57 is a specially designed extremely powerful rotary pump. The shaft on the pump 57 is provided with a drive wheel 108 with the clutch attachment revolubly secured on the pump shaft 109. Engaging with the drive wheel clutch is a slidable clutch 110 actuated by the clutch lever 11 pivoted to the bracket 112. By this arrangement the pump may be selectively placed in or out of engagement with the remainder of my device. The gin is supported on the tanks in front of the front wheels of the tractor in order to give space for the ingress and egress of the operator to crank the engine. The gin has its saws 86 rotatively mounted in the casing 87 with the gin brush 88 rotatively mounted in proper spaced relationship with the gin saws 86 and with the beater 89 rotatively mounted within the casing 87 in operative spacing with the gin saws and the gin brush. Numeral 90 designates the hose plate to which are secured the hose 91 used in picking. All bearings throughout are vacuum tight. I prefer to use six of said hose which are in fluid communication with nozzles held in the operator's hands and also in fluid communication with the inside of the casing 87. Numeral 92 designates a separator for separating the lint from the seed. Numeral 93 designates a seed container having the drawer 94. The drawer 94 must be positioned in the seed container 93 so as not to prevent admission of air at this point. Numeral 95 designates the flap valve housing connection leading from the gin to the container such as 20 and 21. The arrows shown in Fig. 3 indicate the rotational direction of movement of the beater saws and brush. The cotton enters through the hose plate into the casing 87 near its top where it is beaten or spread by the blades of the beater 89 and then passes over the saws 86 where the seed is torn from the lint and passes on from the gin brush 88 and the gin saw, the brush pulling the lint in the direction of its rotation into the valve housing connection 95 while the seed owing to the rotational direction of the saw 86, and owing to its greater weight than the lint, drops on to the separator 92 to the right in Fig. 3 into the seed container 93. The shafts on which the gin saw 86 and the gin brush 88 are mounted are journaled in the casing 87 and they extend in one side thereof beneath each other. Pulleys 96 and 97 are keyed to each one of these shafts and the pulleys are connected by the belt 98. A valve 100 is placed in the pipe connecting the gin to the flap valve housing connection. This valve is of the flap valve type and consists of a valve plate 100 hinged to the link 101 which in turn is secured to the frame at 102. There are two of such valves. The pipe is enlarged to permit the valve plate and links just described to be positioned in the enlargement when the valve is open and thereby not restrict the cross sectional area of the pipe at this point. The links are resorted to in order to positively close the valve when desired. In order to effect this result, it is necessary that the valve plate 100 lay flat against its seat. This could not be accomplished without the links such as 101. It will be seen that when the vacuum is maintained in either one of the vacuum tanks by means of the three way valve that fact will cause the companion valve to remain open. It is likewise obvious that when the vacuum is destroyed by the three way valve that the valve will be closed gravitationally.

In order to take care of the alinement strain in the pipes connecting the gin with the tanks, and in order to provide for small relative movement, a rubber connecting hose 103 secured by metal bands 103$^a$ is placed in the lines between the gin and the tanks. To the shaft of the gin saws on the end opposite that to which is secured the pulley 97 is keyed the larger pulley 104. By means of the belt 105 the pulley 104 is connected to the drive pulley 17 of the tractor. By means of the belt 106 the drive pulley of the pump 57 is connected to the drive pulley 17. Numeral 107 designates an excess vacuum pressure valve positioned on the pump 57.

The path of the cotton from the boll through the operator's nozzle is as follows: It passes through the hose 91 which may all be operating at one time into the vacuum tight casing 87 wherein it is ginned, the seed falling into the seed container 93 into the drawer 94 where it may be easily removed. The lint from which the seed has been removed now passes through the flap valve connection 95, through the rubber hose 103, eventually into the spout 72 into the sacks 71. This movement of the cotton is caused entirely by the vacuum created by the vacuum pump through the operating tank, the gin and hose 91 at all times.

The sacks 71 being porous, any dirt that may still be in the cotton filters through the sacks into the tanks such as 20 and 21 from which it may be periodically removed by sweeping through the door such as 62.

In order to place as much cotton as possible in a sack, such as 71, the cotton may be periodically rammed into the sack manually when the vacuum is closed in the tank by opening the door 62. By this means a greatly increased amount of cotton may be forced into the sacks.

Numeral 113 designates a rack secured on the top of the tanks for carrying hose, nozzles, etc.

Figure 6A:

In order to enable the cotton picker to use both of his hands in picking, it is possible to position a T union on a waist belt and connect the hose such as 91 thereto and to further secure hose at the ends of the T that protrude laterally. The nozzles are secured to the ends of these latter hose and they may be of sufficient length to encircle the body of the picker with extending ends of arm's length. In order to demonstrate this, I have included Fig. 6a.

What I claim and mean to secure by Letters Patent is—

1. An apparatus of the class described, including a pair of tanks, a suction conduit, branches leading from the suction conduit to each of said tanks, a three way valve controlling said passages, said valve so constructed as to always maintain such communication with at least one tank, an operating rod extending from said valve to the opposite end of said tanks, a handle for operating said valve, hinged closures for the tanks, induction passages discharging into the tanks, and valves for controlling said induction passages operable to open the induction passage leading to the tank, wherein suction is established, and to close the remaining induction passages.

2. In an apparatus of the class described, a plurality of tanks, a single suction conduit, means for selectively communicating said suction conduit with said tanks, said means being so constructed as to always maintain communication with at least one tank, an induction conduit leading to each tank, a valve for controlling the passage from each induction conduit to the respective tank, a rod slidably secured in each tank, a bag having a lap seam, with perforations therein, clips secured to each rod, whereby said bag may be secured to one of said rods by means of said perforations engaging said clips, and closure means in each tank whereby the bag may be removed from one of the tanks while the other of said tanks is in communication with said suction conduit.

3. A cotton harvester comprising in combination a plurality of tanks, a tractor having a drive pulley, said tanks being mounted on said tractor, and a vacuum pump mounted on said tractor for producing vacuum in said tanks, said pump being operable by said pulley.

4. In a cotton harvester, the combination with a tractor, of a saddle detachably secured to the forward end of said tractor and provided with seats, a pair of cotton receiving suction tanks disposed longitudinally of said tractor to each side thereof, the forward end of each tank being supported by said saddle, means for securing said tanks to said saddle, a pair of columns secured to the rear end of said tractor, and extending upwardly therefrom, and means carried by said columns for engaging and suspending the rear ends of said tanks.

5. A cotton harvester comprising in combination with a tractor, a saddle member secured to said tractor and extending transversely thereabove, a transverse member carried by said tractor in longitudinally spaced relation with said saddle and on a horizontal plane disposed above said saddle member, a pair of cotton receiving suction tanks spaced to each side of the longitudinal axis of said tractor and having one of their ends resting on said saddle member, means suspended from each end of said transverse member for supporting the other ends of said tanks, a vacuum pump carried by said tractor, a suction conduit connecting the suction side of said pump with said tanks, and valve means in said suction conduit for controlling the communication between said pump and said tanks, said valve means being so arranged that one or the other of said tanks is always in communication with said pump.

6. A cotton harvester comprising in combination with a tractor, a pair of cotton receiving suction tanks arranged each to one side of the longitudinal axis of said tractor, means for detachably supporting said tanks on said tractor on a horizontal plane above the same, a vacuum pump carried by said tractor, a suction conduit connecting the suction side of said pump with said tanks, valve means in said suction conduit for controlling the communication between said pump and the suction ends of said tanks, said valve means being operable to establish communication between said pump and either one or both of said tanks, one of said tanks being always in communication with said pump, a chamber member arranged adjacent to the other ends of said tanks, a conduit connecting each tank with said chamber member, a flap valve in each conduit automatically operable to open and close the communication between said chamber member and the respective tank in correlation with the suction conditions prevailing in the latter, and a cotton picking connection opening to the atmosphere and terminating within said chamber member.

7. A cotton harvester comprising in combination a tractor, a saddle member detachably secured to the forward end of said tractor and extending transversely thereabove, a transverse member detachably carried by the rear end of said tractor in parallelism with said saddle and disposed on a horizonal plane above the latter a pair of cotton receiving suction tanks arranged each to one side of the longitudinal axis of said tractor and having the forward end resting on said saddle member, means suspended from each end of said transverse member for supporting the rear end of each tank, a vacuum pump carried by said tractor and operable by the actuating mechanism thereof, a suction conduit leading from the suction side of said pump to one end of each tank, valve means in said suction conduit for connecting either one or both of said tanks with said pump, said valve means being so arranged that it is impossible to shut off both of said tanks simultaneously, a cotton discharge elbow arranged within the other end of each tank, a chamber member arranged adjacent to said tanks, a cotton delivery pipe connection leading from said chamber member to each discharge elbow, a flap valve in each pipe connection for closing said pipe when the corresponding tank is inactive, and a plurality of flexible hose connections communicating with and located exteriorly of said chamber member for picking cotton and delivering it by suction into said chamber member.

8. A cotton harvester comprising in combination a tractor provided with a drive pulley, a pair of cotton receiving suction tanks, means for supporting said tanks on said tractor longitudinally thereof and in a horizontal plane above said tractor, a vacuum pump carried by said tractor and operable by said drive pulley thereof, a relief valve on said pump for connecting the latter with atmosphere when the suction is subnormal, a suction conduit connecting the suction side of said pump with each of said tanks, a three-way valve in said suction conduit for establishing communication between said pump and either one or both of said tanks, said valve being so arranged that one of said tanks is in communication with said pump at all times, and connections opening into said tanks and extending exteriorly thereof for delivering cotton thereinto by suction.

9. In a cotton harvester, the combination with a tractor, of a saddle member detachably secured to the front end of said tractor and provided with a pair of longitudinally disposed seats each spaced on each side of the tractor and disposed thereabove, a support detachably secured to the rear end of said tractor and extending upwardly therefrom, a cross member carried by said support and disposed on a horizontal plane above said saddle, and a pair of horizontally and longitudinally disposed cotton receiving suction tanks arranged above said tractor and spaced from each other, the front ends of said tanks resting on the seats of said saddle and the rear ends of said tanks being suspended from said cross member.

10. In a cotton harvester, the combination with a wheeled support, of a saddle member detachably secured to the front end of said support and provided at its ends with longitudinally disposed seats spaced on each side of the support above the horizontal plane thereof, a pair of vertically disposed columns detachably secured to the rear end of said support, a cross member carried by said columns and arranged on a horizontal plane above said saddle, a pair of horizontally and longitudinally disposed cotton receiving suction tanks arranged above said support in spaced relation with each other and with the longitudinal axis thereof, means for tying the front ends of said tanks onto the seats of said saddle, and means for suspending the rear ends of said tanks from said cross member.

11. In a cotton harvester, the combination with a tractor, of a saddle member detachably secured to the front end of said tractor and provided with a pair of longitudinally disposed seats each spaced on each side of the tractor and disposed thereabove, a support detachably secured to the rear end of said tractor and extending upwardly therefrom, a cross member carried by said support and disposed on a horizontal plane above said saddle, a pair of horizontally and longitudinally disposed cotton receiving suction tanks arranged above said support and spaced from each other, the front ends of said tanks resting on the seats of said saddle and the rear ends of said tanks being suspended from said cross member, and a vacuum pump carried by said tractor and operatively connected to the suction ends of said tanks for creating vacuum therein, the other ends of said tanks being adapted to have delivered thereinto cotton by suitable suction connections.

12. In a cotton harvester, the combination with a tractor including a drive pulley operable by the engine thereof, of a front support member detachably secured to the front end of said tractor and extending thereabove, said support member being provided with a pair of longitudinally disposed spaced seats, a rear support secured to the rear end of said tractor and extending thereabove, said support including a transverse member, a pair of horizontally and longitudinally disposed cotton receiving suction tanks arranged above said tractor and spaced from each other and from the longitudinal axis thereof, a vacuum pump carried by said tractor and operable by said drive pulley, suction connections between said tanks and said pump for producing vacuum in said tanks, valve means in said connections for controlling communication between said pump and said tanks whereby either one or both of said tanks can be connected to said pump, and cotton delivery means for said tanks and including a plurality of flexible hose connections for gathering cotton, a chamber member common to all of said hose connections, a pipe connection leading from said chamber to each other, and a flap valve in said pipe connection for closing communication therethrough when the corresponding tank is inactive and operable by suction to open the communication when said tank is active.

13. A cotton harvester comprising in combination a tractor having a power driven pulley, a vacuum pump mounted on said tractor and operable by said pulley, a plurality of tanks mounted on said tractor, connections between said pump and said tanks for producing vacuum in the latter, and a plurality of hose connections leading from said tanks and opening to atmosphere for picking cotton and delivering it to said tanks.

14. A cotton harvester comprising in combination a tractor having an engine, a vacuum pump carried by said tractor, means for operatively connecting said engine with said pump, a tank, means for supporting said tank on said tractor, connections between said pump and said tank for producing vacuum in the latter, a plurality of flexible hose connections leading from said tank and opening to atmosphere for picking cotton and delivering it to said tank, and foraminous means in said tank for receiving said cotton and preventing it from entering said connections leading to said pump.

In testimony whereof I affix my signature.

JOHN S. THURMAN.